March 27, 1951 R. R. FARRELL 2,546,258
FLUID CONTROL MEANS
Filed Sept. 4, 1946
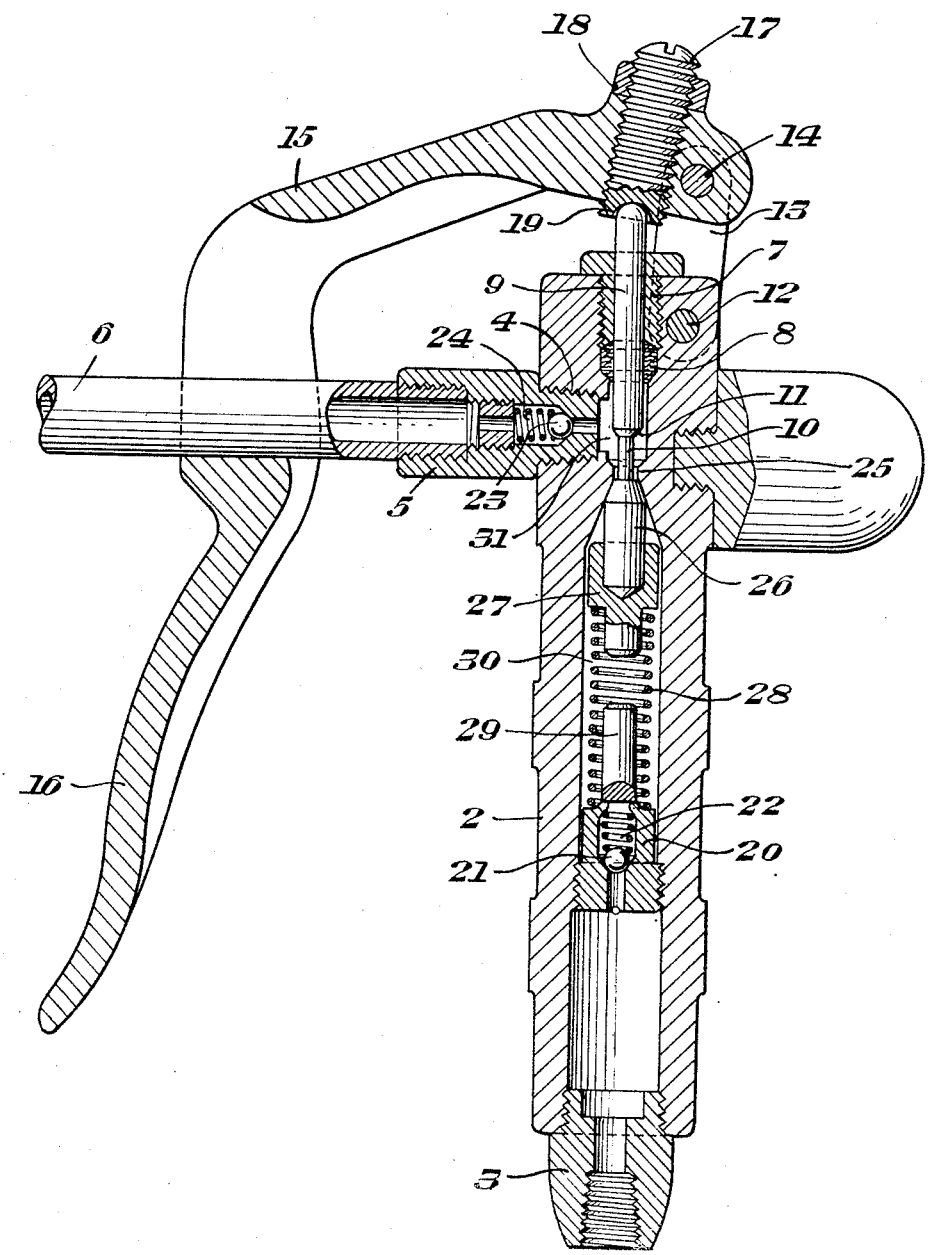
INVENTOR
Richard R. Farrell Patented Mar. 27, 1951

2,546,258

UNITED STATES PATENT OFFICE 2,546,258

FLUID CONTROL MEANS

Richard R. Farrell, Oakmont, Pa., assignor to Universal Lubricating Systems, Inc., Oakmont, Pa., a corporation of Delaware Application September 4, 1946, Serial No. 694,765

6 Claims. (Cl. 103—153)

This invention relates to fluid control means. It relates particularly to means for controlling fluid being delivered under pressure.

My invention has especial utility in the control of more or less viscous fluids under pressure which are adapted to be delivered to delivery points, as, for example, lubricant for lubricating machine parts such as automobile chassis bearings.

More specifically, my invention is adapted to be embodied in a lubricant control valve for disposal in the lubricant delivery line between a lubricant compressor from which lubricant is supplied under pressure and a coupling on the end of the lubricant delivery line which is adapted to be coupled to a fitting through which lubricant is delivered to a bearing. In certain of its more specific aspects the invention has to do with a so-called "booster valve" whereby the lubricant being delivered through the valve may be subjected to pressures materially greater than the pressure to which the lubricant is subjected in the compressor. While booster valves generally are known in the art my invention when embodied in a booster valve brings about important advantages resulting in the possibility of attainment of materially higher pressures than have been attainable with booster valves heretofore available.

In connection with the embodiment of my invention in a booster valve it should be pointed out that a perplexing problem exists in the lubrication of bearings such as automobile and truck chassis bearings. Such bearings on occasion become clogged with dried lubricant, dirt and foreign matter of various kinds and become "frozen," i. e., highly resistant to the ingress of lubricant attempted to be forced in by high pressure lubricating mechanism when the bearings are being lubricated.

It is of vital importance that lubricant be forced into frozen bearings to lubricate them; otherwise the bearings may seize or burn out, resulting not only in the necessity of their replacement but in a serious accident hazard. It has long been recognized that to lubricate frozen bearings it is necessary to apply the lubricant to the bearings under very high pressures; that is, pressures ranging in the thousands of pounds per square inch. To this end larger, more powerful and more expensive lubricant compressors have been designed. The use of such compressors, however, presents further problems which are virtually as vexatious as the primary problem of forcing lubricant into frozen bearings. Among such further problems is that of providing hose which will withstand the extremely high pressures created by the more powerful compressors. Hose of sufficient strength is very costly and difficult to obtain and even then its life is short. Moreover, the control and delivery equipment must be constructed to function satisfactorily under the extremely high pressures imposed which results in further increased cost in design and construction of the equipment.

In an effort to relieve the hose and the delivery equipment between the compressor and the control valve of the extremely high pressures above referred to booster valves have heretofore been provided, such valves having means for increasing by displacement in the control valve mechanism the pressure on the lubricant between the control valve and the bearing. However, the booster valves heretofore provided have fallen far short of satisfactorily solving the problem. While they have to some extent increased the pressure on the lubricant relatively to the pressure to which the lubricant is subjected by the compressor the increase has, generally speaking, not been great enough to make possible the lubrication of tenaciously frozen bearings without employing an extremely powerful compressor. One very intricate booster valve has been made which has developed higher pressures than the other heretofore available but it is costly to make, relatively likely to become out of order and difficult to operate. It is common knowledge among garage and service station operators and attendants that the so called high pressure lubricating equipment heretofore available has been unsatisfactory. Indeed, there have been instances very recently in which oil companies have had to install pressure regulators to reduce the air line pressure going to lubricant compressors in service stations in an effort to prevent bursting of hose even though it was recognized that this would result in inability to force lubricant into many tenaciously frozen bearings.

I have discovered how to make a booster valve so that it will satisfactorily increase the pressure on the lubricant between the control valve and the bearing so that satisfactory lubricating results are obtainable with relatively low pressures in the compressor. My booster valve has been subjected to actual use and to extensive tests and by reason of its novel construction brings about an increase in the pressure on the lubricant between the control valve and the bearing which is far greater than the increase obtainable with booster valves heretofore available. The result is that relatively light, inexpensive compressors and relatively inexpensive hose may be used and the life of the hose and other parts of the equipment is greatly prolonged—this while at the same time obtaining greatly superior lubricating results.

My invention further relates to fluid control means embodying means for shutting off the flow of fluid being delivered operable by the same means which initiates the delivery of fluid. My invention when so embodied results in what is known in the art as a "single shot" valve, but my valve has important advantages in simplicity and reliability of operation. Other single shot valves heretofore provided have been of extremely complex structure which are expensive to make and which quickly lose adjustment or become out of order.

I provide fluid control means comprising a body adapted to receive fluid under pressure, a fluid delivery conduit extending laterally from and communicating with the body, a check valve in the body permitting fluid under pressure entering the body to flow toward the delivery conduit but not in the reverse direction, a control valve in the body between said check valve and the region of the junction between the body and the delivery conduit effective when closed to prevent fluid in the body from flowing toward the delivery conduit, a second check valve disposed in the region of the junction between the body and the delivery conduit permitting fluid in the body to enter the delivery conduit but not to flow in the reverse direction and means for operating the control valve, said means projecting into the body between the two check valves and effecting substantially greater displacement therein when the control valve is open than when it is closed. This is a booster valve which is capable of attaining greater pressures than prior booster valves because of the disposal of the second check valve in the region of the junction between the body and the laterally extending delivery conduit. Such disposal of the second check valve results in keeping to a minimum the volume of the compression chamber between the two check valves which in turn minimizes the amount of air entrapped in the lubricant which is compressed by the booster valve. The lubricant itself is virtually non-compressible but it contains minute air bubbles which are compressible. By my novel construction of the booster valve I reduce to a minimum the amount of air entrained in the lubricant which may be present in the compression chamber of the booster valve when the pressure is being built up. The control valve operating means is preferably a solid pin as distinguished from a sleeve, the pin having advantages in reliability and efficiency. The second or outlet check valve is preferably disposed in the delivery conduit immediately adjacent the body.

I further provide fluid control means comprising a conduit adapted to receive fluid under pressure, a valve in the conduit effective when closed to prevent fluid in the conduit from flowing in the direction in which it is urged by said pressure, means for operating said valve and a second valve distinct from the first mentioned valve effective to shut off flow of fluid when the means for operating the first mentioned valve has been operated to a predetermined extent to open the first mentioned valve. The valve operating means preferably passes through the valve seat and has means cooperating with the valve seat to shut off the flow of fluid when the valve operating means has been operated to a predetermined extent. Preferably the control valve is operated by a pin having a shoulder adapted when the means for operating the control valve approaches the end of its stroke to close the passage through which the lubricant flows when the control valve is open.

Other details, objects and advantages of the invention will become apparent as the following description of a present preferred embodiment thereof proceeds.

In the accompanying drawing I have shown a present preferred embodiment of the invention, the single figure constituting a central cross-sectional view through a lubricant control valve.

The control valve comprises an elongated body 2 which has a longitudinal bore therethrough. The body has applied thereto at its lower end viewing the figure a fitting 3 adapted for connection with a source of lubricant under pressure. Any suitable lubricant compressor may be employed, the compressed lubricant being delivered therefrom through a flexible tube or hose adapted to be connected with the fitting 3. Thus the lower end of the bore in the body 2 is always subjected to the pressure imposed on the lubricant by the compressor.

The body 2 has a lateral bore 4 into which is threaded a fitting 5. The fitting 5 constitutes the inner end of a delivery conduit through which lubricant is delivered to the coupling. The delivery conduit may comprises a metal tube 6 threaded into the fitting 5 and carrying a coupling (not shown) at its outer end.

The upper end of the longitudinal bore in the body 2 is fitted with a bushing 7 and packing 8. Slidable within the bushing and sealed by the packing is a pin 9 having a reduced lower extremity 10, a shoulder 11 being formed between the body and the lower extremity of the pin. Pivoted to the body at 12 are opposed links 13. Each link 13 is pivoted at 14 to a lever 15 having a handle 16 adapted to lie generally opposite the body 2 so that the body 2 and the handle 16 may be gripped by the hand and by a squeezing action pulled together. The lever 15 has adjacent the pivot 14 an adjustable screw 17 adapted to be maintained in desired adjustment by a nut 18. The lower end of the screw 17 is provided with a cavity 19 receiving the upper end of the pin 9.

Connected within the body 2 is a fitting 20 having a check valve 21 maintained against its seat by a spring 22, the check valve 21 being the inlet check valve and permitting fluid to pass in the direction from the compressor to the point of delivery but not in the reverse direction. The fitting 5 has a similar check valve 23 pressed toward its seat by a spring 24, the valve 23 being the outlet check valve and, like the valve 21, permitting fluid to pass in the direction from the compressor to the point of delivery but not in the reverse direction.

The bore in the body 2 is necked in at 25 to provide a double faced valve seat. Cooperating with the bottom of the valve seat is a fluid control valve 26 mounted in a thimble 27 and pressed against the bottom of the seat 25 by a spring 28 bearing against the fitting 20. A pin 29 enters the lower portion of the spring 28 to aid in guiding the spring and to reduce the volume of the chamber between the check valves 21 and 23.

The lower end of the pin 9 passes through the valve seat 25 and engages the valve 26. When the lever 15 is operated by squeezing the handle 16 and the body 2 together the pin 9 is moved downwardly and opens the valve 26 against the action of the spring 28 and the pressure of the lubricant in the chamber 30 between the valve 21 and the valve 26. When the handle 16 almost touches the body 2 the shoulder 11 seats against the upper face of the valve seat 25 to shut off the flow of lubricant.

The operation of the fluid control means will now be described. With the parts in the position shown in the drawing fluid under the pressure created in the compressor stands in the lower end of the bore of the body 2 and in the chamber 30 between the valve 21 and the seat 25. When the control valve 26 is opened by movement of the handle 16 a short distance toward the body 2 the lubricant under the pressure in the compressor passes through the seat 25, opens the valve 23 and passes to the bearing. So long as the control valve 26 is held open with the handle 16 in a position intermediate its extreme outward position as shown in the drawing and the other extreme position in which it almost engages the body 2 and so long as the resistance of the bearing is less than the compressor pressure lubricant flows from the compressor through the valve and into the bearing. When the resistance offered by the bearing exceeds the compressor pressure flow of lubricant from the compressor to the bearing stops. This may happen because of a so-called "frozen" bearing. It is then desired to force lubricant into the bearing under pressure substantially greater than the compressor pressure. This can be done by proper operation of the valve.

When the resistance of the bearing is greater than the compressor pressure and the lubricant stops flowing from the compressor to the bearing the handle 16 is released and the spring 28 seats the control valve 26. At the same time the pin 9 moves upwardly within the chamber 31 between the valve 26 and the valve 23 a distance equal to the control valve travel. The upward movement of the pin decreases the volume in the chamber 31 displaced by the pin, which results in reduction of the pressure in that chamber to a pressure less than the compressor pressure. This results in passage of some lubricant past the inlet check valve 21 into the chamber 30 and some lubricant from the chamber 30 into the chamber 31 just before the control valve 26 closes. The handle 16 is again moved toward the body 2, forcing the pin 9 downwardly and opening the valve 26. The increased displacement of the pin in the chamber 31 increases the pressure in that chamber to a pressure greater than the pressure beyond the outlet check valve 23. This forces lubricant through the outlet check valve, increasing the pressure of lubricant against the bearing. By again releasing the handle 16 and pumping it back and forth by repeated gripping and releasing actions a very few times (ordinarily not over three or four) the pressure of lubricant against the bearing is immediately built up to the maximum pressure desired. In virtually all cases the relatively high pressure thus created is sufficient to overcome the resistance or back pressure of the frozen bearing and thus cause lubrication of the bearing.

For the lubrication of normal or unfrozen bearings the single shot feature is of utility. When a normal bearing is being lubricated lubricant will flow from the compressor to the bearing at all times when the control valve 26 is open. But when the handle 16 reaches the end of its stroke approximately in contact with the body 2 the shoulder 11 seats on the upper surface of the double-faced valve seat 25 and closes the passage through that seat. Thus if it is desired to deliver only a predetermined minimum amount of lubricant to a bearing the handle 16 is moved through the entire extent of its movement so that it almost touches the body 2, limiting the amount of lubricant that can pass through the valve seat 25. Of course, the faster the handle 16 is moved the less lubricant will pass as the less time will be afforded for its passage. An operator with a little experience can learn how fast to move the handle 16 to deliver a "shot" of lubricant of predetermined amount into a bearing.

Thus without any adjustments or alterations whatever my valve is adapted for use as a single shot valve and also for use as a booster valve. As a booster valve my valve is extremely efficient and capable of building up higher pressures than booster valves heretofore available. Both as a booster valve and as a single shot valve my valve is of extremely simple and rugged construction containing few parts, the valve being highly reliable and not likely to become out of order as well as being of extremely low cost.

While I have shown and described a present preferred embodiment of the invention it is to be distinctly understood that the invention is not limited thereto but may be otherwise variously embodied within the scope of the following claims.

I claim:

1. Fluid control means comprising a body adapted to receive fluid under pressure, a fluid delivery conduit extending laterally from and communicating with the body, a check valve in the body permitting fluid under pressure entering the body to flow toward the delivery conduit but not in the reverse direction, a double-faced valve seat in the body between said check valve and the region of the junction between the body and the delivery conduit, a control valve adapted to close against one face of the seat to prevent fluid in the body from flowing toward the delivery conduit, a second check valve disposed in the region of the junction between the body and the delivery conduit permitting fluid in the body to enter the delivery conduit but not to flow in the reverse direction and means including a pin and lever for operating the control valve, the pin passing through the seat and having a first portion of substantially less cross-sectional area than the seat opening, a second portion forming a second valve adapted to seat on the other face of the valve seat to shut off flow of fluid when the pin has been operated to a predetermined extent to open the first mentioned valve and a third portion projecting from an end of the body, the lever being connected to the body for swinging movement and having a portion bearing against the third portion of the pin, the pin effecting substantially greater displacement in the body when the control valve is open than when it is closed.

2. A booster valve for a grease gun for applying to grease delivered under pressure from the grease gun a greatly increased pressure to enable the grease to overcome the resistance of "frozen" fittings or bearings comprising a body having a chamber therein adapted to be connected with the grease gun and to contain grease under the pressure imparted to it by the grease gun, a grease delivery connection extending from the body and communicating with the chamber adapted to be applied to a fitting or bearing through which grease is adapted to be delivered, a check valve in the body at the inlet to the chamber permitting grease from the grease gun to flow into the chamber toward the grease delivery connection but not in the reverse direction, a control valve in the chamber beyond the check valve in the direction of flow of grease toward the grease delivery connection, the control valve being effective when closed to prevent grease in the chamber from flowing toward the grease delivery connection, and means for operating the control valve, said means projecting into the chamber and being movable thereinto to effect substantially greater displacement therein when the control valve is open than when it is closed to displace grease in the chamber whereby to force grease under greatly increased pressure into said connection.

3. A booster valve for a grease gun for applying to grease delivered under pressure from the grease gun a greatly increased pressure to enable the grease to overcome the resistance of "frozen" fittings or bearings comprising a body having a chamber therein adapted to be connected with the grease gun and to contain grease under the pressure imparted to it by the grease gun, a grease delivery connection extending from the body and communicating with the chamber adapted to be applied to a fitting or bearing through which grease is adapted to be delivered, a check valve in the body at the inlet to the chamber permitting grease from the grease gun to flow into the chamber toward the grease delivery connection but not in the reverse direction, a control valve in the chamber beyond the check valve in the direction of flow of grease toward the grease delivery connection, the control valve being effective when closed to prevent grease in the chamber from flowing toward the grease delivery connection, a second check valve permitting grease from within the chamber to flow through the grease delivery connection but not in the reverse direction and means for operating the control valve, said means projecting into the chamber between the two check valves and being movable thereinto to effect substantially greater displacement therein when the control valve is open than when it is closed to displace grease in the chamber whereby to force grease under greatly increased pressure through the second mentioned check valve into said connection.

4. A booster valve for a grease gun for applying to grease delivered under pressure from the grease gun a greatly increased pressure to enable the grease to overcome the resistance of "frozen" fittings or bearings comprising a body having a chamber therein adapted to be connected with the grease gun and to contain grease under the pressure imparted to it by the grease gun, a grease delivery connection extending from the body and communicating with the chamber adapted to be applied to a fitting or bearing through which grease is adapted to be delivered, a check valve in the body at the inlet to the chamber permitting grease from the grease gun to flow into the chamber toward the grease delivery connection but not in the reverse direction, a valve seat in the body between said check valve and the region of the junction between the body and the grease delivery connection, a control valve in the chamber movable between closed position against the seat and open position away from the seat, the control valve being effective when closed to prevent grease in the chamber from flowing toward the grease delivery connection, a second check valve disposed in the region of the junction between the chamber and the grease delivery connection permitting grease from within the chamber to flow through the grease delivery connection but not in the reverse direction and means for operating the control valve including a pin projecting into the chamber between the two check valves and passing through the seat and movable into the chamber, the pin when moved inwardly engaging and opening the control valve and effecting substantially greater displacement in the chamber when the control valve is open than when it is closed to displace grease in the chamber whereby to force grease under greatly increased pressure through the second mentioned check valve into said connection.

5. A booster valve for a grease gun for applying to grease delivered under pressure from the grease gun a greatly increased pressure to enable the grease to overcome the resistance of "frozen" fittings or bearings comprising a body having a chamber therein adapted to be connected with the grease gun and to contain grease under the pressure imparted to it by the grease gun, a grease delivery connection extending from the body and communicating with the chamber adapted to be applied to a fitting or bearing through which grease is adapted to be delivered, a check valve in the body at the inlet to the chamber permitting grease from the grease gun to flow into the chamber toward the grease delivery connection but not in the reverse direction, a valve seat in the body between said check valve and the region of the junction between the body and the grease delivery connection, a control valve in the chamber movable between closed position against the seat and open position away from the seat, the control valve being effective when closed to prevent grease in the chamber from flowing toward the grease delivery connection, a second check valve disposed in the region of the junction between the chamber and the grease delivery connection permitting grease from within the chamber to flow through the grease delivery connection but not in the reverse direction and means for operating the control valve including a pin projecting into the chamber between the two check valves and passing through the seat and movable into the chamber, the pin having a first portion of substantially less cross-sectional area than the seat opening and a second portion of greater cross-sectional area, the first portion of the pin when the pin is moved inwardly engaging and opening the control valve and the pin as a whole including the second portion thereof effecting substantially greater displacement in the chamber when the control valve is open than when it is closed to displace grease in the chamber whereby to force grease under greatly increased pressure through the second mentioned check valve into said connection.

6. A booster valve for a grease gun for applying to grease delivered under pressure from the grease gun a greatly increased pressure to enable the grease to overcome the resistance of "frozen" fittings or bearings comprising a body having a chamber therein adapted to be connected with the grease gun and to contain grease under the pressure imparted to it by the grease gun, a grease delivery connection extending from the body and communicating with the chamber adapted to be applied to a fitting or bearing through which grease is adapted to be delivered, a check valve in the body at the inlet to the chamber permitting grease from the grease gun to flow into the chamber toward the grease delivery connection but not in the reverse direction, a double-faced valve seat in the body between said check valve and the region of the junction between the body and the grease delivery connection, a control valve in the chamber movable between closed position against one face of the seat and open position away from said face, the control valve being effective when closed to prevent grease in the chamber from flowing toward the grease delivery connection, a second check valve disposed in the region of the junction between the chamber and the grease delivery connection permitting grease from within the chamber to flow through the grease delivery connection but not in the reverse direction and means for operating the control valve including a pin projecting into the chamber between the two check valves and passing through the seat and movable into the chamber, the pin having a first portion of substantially less cross-sectional area than the seat opening and a second portion of greater cross-sectional area forming another valve adapted to seat on the other face of the double-faced valve seat to shut off flow of grease when the pin has been moved inwardly to a predetermined extent, the first portion of the pin when the pin is moved inwardly engaging and opening the control valve and the pin as a whole including the second portion thereof effecting substantially greater displacement in the chamber when the control valve is open than when it is closed to displace grease in the chamber whereby to force grease under greatly increased pressure through the second mentioned check valve into said connection.

RICHARD R. FARRELL.

REFERENCES CITED

The following references are of record in the file of this patent:

UNITED STATES PATENTS

| Number | Name | Date |
| --- | --- | --- |
| 239,645 | Bronk | Apr. 5, 1881 |
| 715,726 | Wright | Dec. 9, 1902 |
| 894,087 | Watkins | July 21, 1908 |
| 1,133,682 | Trist | Mar. 30, 1915 |
| 1,819,381 | Palmer | Aug. 18, 1931 |
| 1,995,377 | Creveling | Mar. 26, 1935 |
| 2,336,282 | Mueller | Dec. 7, 1943 |

FOREIGN PATENTS

| Number | Country | Date |
| --- | --- | --- |
| 732,435 | France | June 14, 1932 |